(12) United States Patent
Balaga et al.

(10) Patent No.: US 10,990,592 B2
(45) Date of Patent: Apr. 27, 2021

(54) QUERYING OF PROFILE DATA BY REDUCING UNNECESSARY DOWNSTREAM CALLS

(71) Applicant: Microsoft Technology Licensing, LLC, Redmond, WA (US)

(72) Inventors: Sirish Kumar Balaga, Sunnyvale, CA (US); Jeffrey P. Wehrwein, Mountain View, CA (US); Christopher Gomes, Redwood City, CA (US); Kevin Tse-Long Fu, Sunnyvale, CA (US); Yanhong Yuan, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 813 days.

(21) Appl. No.: 15/799,637

(22) Filed: Oct. 31, 2017

(65) Prior Publication Data

US 2019/0130000 A1 May 2, 2019

(51) Int. Cl.
*G06F 16/2453* (2019.01)
*G06F 16/9535* (2019.01)
*G06F 16/2455* (2019.01)
*G06F 21/62* (2013.01)

(52) U.S. Cl.
CPC .... *G06F 16/24542* (2019.01); *G06F 16/2453* (2019.01); *G06F 16/24568* (2019.01); *G06F 16/9535* (2019.01); *G06F 21/62* (2013.01)

(58) Field of Classification Search
CPC ............................ G06F 16/2453; G06F 21/62
See application file for complete search history.

(56) References Cited

U.S. PATENT DOCUMENTS

| | | | | |
|---|---|---|---|---|
| 6,253,203 | B1* | 6/2001 | O'Flaherty | G06F 21/6245 |
| 6,760,735 | B1* | 7/2004 | Rusche | G06F 3/0482 |
| 6,957,225 | B1* | 10/2005 | Zait | G06F 16/2264 |
| 7,853,786 | B1* | 12/2010 | Fultz | H04L 63/102 |
| | | | | 713/166 |
| 8,661,023 | B1* | 2/2014 | Chun | G06F 16/9027 |
| | | | | 707/718 |
| 2007/0006203 | A1* | 1/2007 | Marwinski | G06F 9/44536 |
| | | | | 717/166 |
| 2009/0006316 | A1* | 1/2009 | Fan | G06F 16/838 |
| 2014/0025702 | A1* | 1/2014 | Curtiss | G06Q 30/02 |
| | | | | 707/769 |
| 2014/0040223 | A1* | 2/2014 | Andreasen | G06F 16/95 |
| | | | | 707/705 |

(Continued)

*Primary Examiner* — Charles E Lu
(74) *Attorney, Agent, or Firm* — Schwegman Lundberg & Woessner, P.A.

(57) ABSTRACT

The disclosed embodiments provide a system for processing a query of profile data. During operation, the system obtains a set of profile fields requested in a query of profile data and one or more profile view settings associated with the query. Next, the system determines, based on the set of profile fields and the profile view setting(s), one or more downstream calls to omit from a set of downstream calls available to generate a result of the query. The system then generates one or more additional downstream calls in the set of downstream calls to resolve a parameter used to generate a result of the query. Finally, the system uses the parameter to generate the result of the query without making the downstream call(s).

20 Claims, 4 Drawing Sheets

(56) References Cited

U.S. PATENT DOCUMENTS

| | | | |
|---|---|---|---|
| 2016/0026718 A1* | 1/2016 | Hopkins | G06F 16/9535 707/715 |
| 2016/0034700 A1* | 2/2016 | Nash | G06F 21/6227 707/783 |
| 2016/0364581 A1* | 12/2016 | Sethi | G06F 21/6245 |
| 2018/0039692 A1* | 2/2018 | Wang | G06F 16/2448 |

* cited by examiner

QUERYING OF PROFILE DATA BY REDUCING UNNECESSARY DOWNSTREAM CALLS

BACKGROUND

Field

The disclosed embodiments relate to techniques for querying profile data. More specifically, the disclosed embodiments relate to techniques for improving querying of profile data by reducing unnecessary downstream calls.

Related Art

Online networks may include nodes representing individuals and/or organizations, along with links between pairs of nodes that represent different types and/or levels of social familiarity between the nodes. For example, two nodes in a network may be connected as friends, acquaintances, family members, classmates, and/or professional contacts. Online networks may further be tracked and/or maintained on web-based networking services, such as online professional networks that allow the individuals and/or organizations to establish and maintain professional connections, list work and community experience, endorse and/or recommend one another, run advertising and marketing campaigns, promote products and/or services, and/or search and apply for jobs.

In turn, online networks may facilitate business activities such as sales, marketing, and/or recruiting by the individuals and/or organizations. For example, sales professionals may use an online professional network to locate prospects, maintain a professional image, establish and maintain relationships, and/or engage with other individuals and organizations. Similarly, recruiters may use the online professional network to search for candidates for job opportunities and/or open positions. At the same time, job seekers may use the online professional network to enhance their professional reputations, conduct job searches, reach out to connections for job opportunities, and apply to job listings.

Each member of an online network may additionally maintain a profile of personal, demographic, and/or professional data related to the member. For example, a member of an online professional network may have a profile that includes a first name, last name, profile photo, location, title, summary, work experience, education, skills, connections, groups, and/or other fields related to the member's profession, career, and/or use of the online professional network. To protect the member's privacy, portions of the profile may only be viewed by other members that meet certain requirements, such as being connected to the member, sharing connections with the member, and/or belonging to the same groups as the member. As a result, queries for profile data in a online network may depend on downstream services that resolve network distance and/or other complex relationships between the requester of the profile data and the member to whom the profile data belongs, which may increase latency and load associated with processing the queries.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
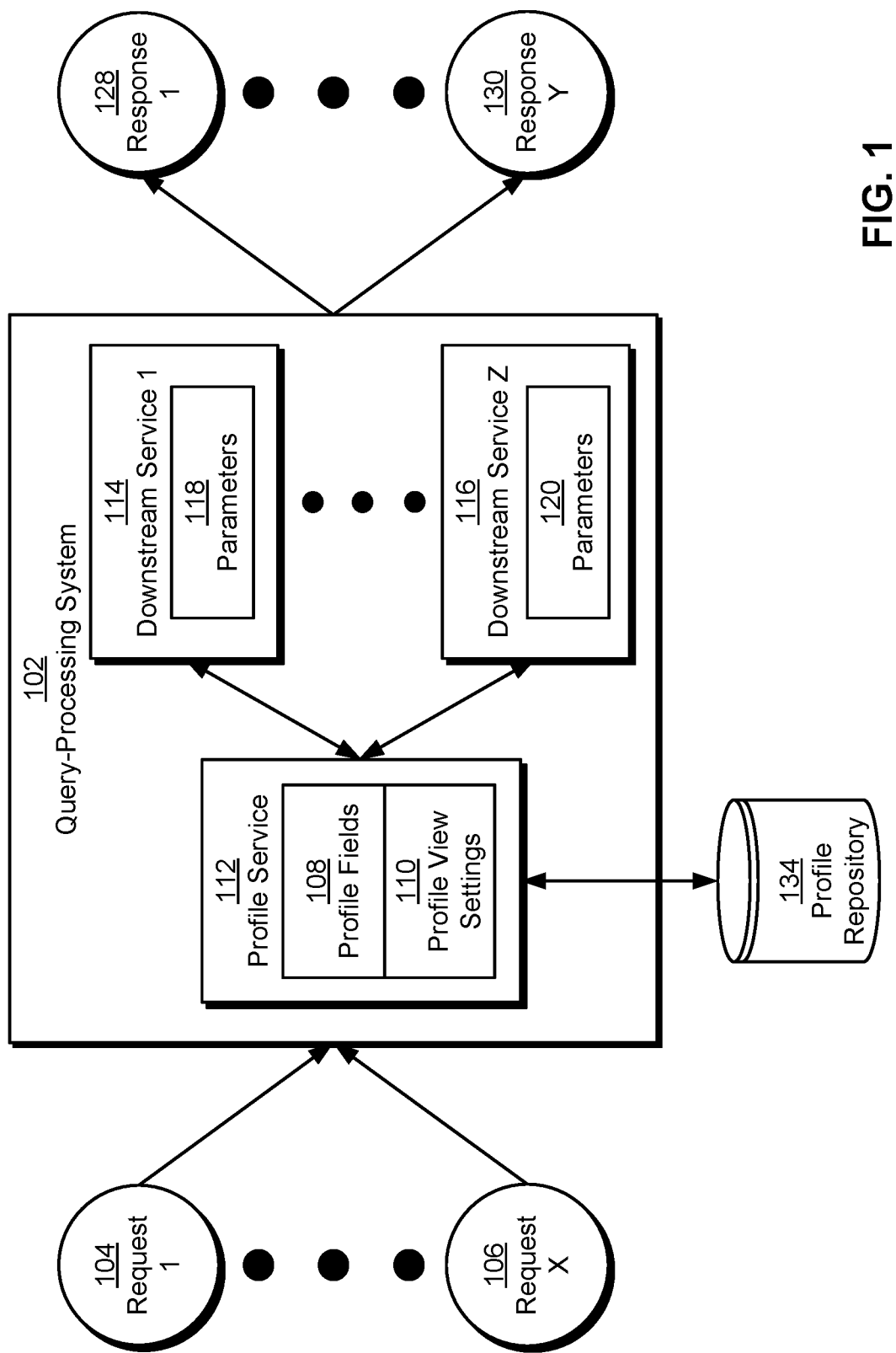
FIG. 1 shows a schematic of a system in accordance with the disclosed embodiments.

The disclosed embodiments provide a method, apparatus and system for processing queries of profile data. As shown in FIG. 1, the system includes a query-processing system 102 that receives requests (e.g., request 1 104, request x 106) for various profile fields 108 in profile data for one or more users and/or entities. For example, the requests may be used to retrieve profile fields 108 containing a first name, last name, date of birth, location, postal address, email address, headline, summary, employment history, education, skills, connections, recommendations, groups, and/or other personal, professional, or demographic attributes of a member of a social network and/or online professional network. In another example, the requests may be used to retrieve profile fields 108 containing a name, location, postal address, email address, industry, size, state of incorporation, overview, logo, website, year founded, and/or other attributes of a company or organization.

Query-processing system 102 includes a profile service 112 that performs operations on profile fields 108 and associated profile view settings 110 in a profile repository 134. For example, profile service 112 may use the requests to perform reads, writes, searches, and/or other operations related to profile data and/or profile fields 108 in profile repository 134. During processing of the requests, profile service 112 may generate results of the requests and return the results in responses (e.g., response 1 128, response y 130) to the requests. Such request processing may be performed in a real-time, near-real-time, and/or offline basis.

Each request may include one or more attributes that are used to process the request. For example, a read request may include an identifier for a "viewer" of the profile data and another identifier for a "viewee" associated with the profile data. The viewer may represent an entity (e.g., social network member, third-party service, etc.) requesting the profile data, and the viewee may represent the entity to which the profile data belongs or pertains. The request may optionally include a number of projection fields representing specific profile fields 108 to be returned in a response to the request.

Profile service 112 processes each request by reading and/or writing the requested profile fields 108 from profile repository 134. For example, profile service 112 may obtain an identifier for a "viewee" from a read request and use the identifier to perform a lookup of profile fields 108 in a database and/or other data store providing profile repository 134. Profile service 112 may include profile fields 108 in a result of the read request and transmit the result in a response to the read request.

Profile service 112 additionally processes read requests by retrieving a set of profile view settings 110 associated with the requested profile fields 108. For example, profile service 112 may retrieve profile settings 110 and profile fields 108 using a single query of profile repository 134, or profile service 112 may generate separate queries of profile repository 134 and/or another data store to obtain profile settings 110 separately from profile fields 108.

Profile view settings 110 may include settings that restrict and/or modify the visibility of profile fields 108. In particular, profile view settings 110 may include privacy settings for the entity to which the profile data belongs (i.e., the "viewee" in a read request). For example, the privacy settings may restrict access to some or all profile fields 108 of the entity to the entity's connections in a social network, second-degree connections of the entity, and/or other types of commonality or relationships with the entity (e.g., overlap at an employer or school, membership in the same group, etc.). In another example, the privacy settings may specify different levels of visibility for different types of profile fields 108 (e.g., profile photo is visible to first-degree connections, last name is visible to second-degree connections, location is visible to everyone, etc.).

Profile view settings 110 may also, or instead, include a viewer setting for the entity generating the request (i.e., the "viewer" in a read request). For example, the viewer setting may include the requester's preferences for displaying, filtering, and/or formatting profile data within a user interface, social network, file, and/or other mechanism for accessing the profile data. In another example, the viewer setting may include a page, platform (e.g., mobile, desktop, etc.), feature, application, service, and/or other environment for which the request is made, which may influence profile fields 108 specified in the request and/or returned in response to the request.

In one or more embodiments, profile service 112 uses profile view settings 110 to generate a set of calls to downstream services (e.g., downstream service 1 114, downstream service z 116) to resolve parameters 118-120 associated with profile view settings 110. For example, profile service 112 may call downstream services related to network distance, pending invitations, group memberships, account types (e.g., paid or non-paid), and/or other parameters 118-120 related to filtering of profile fields 108 during processing of read requests of profile data from profile repository 134. Profile service 112 may then apply filters associated with parameters 118 from privacy settings, viewer settings, and/or other profile view settings 110 for profile fields 108 to obtain a subset of profile fields 108 to return and include the filtered profile fields 108 in a response to the request.

On the other hand, calls to downstream services by profile service 112 may significantly increase the latency of requests for profile data and/or the load on query-processing system 102. For example, profile service 112 may process every request by calling the same set of downstream services to resolve profile fields 108 and/or parameters 118-120 for generating a result of the request, even when some or all downstream services are not required to produce a response to the request. As a result, each request for profile data may generate multiple additional requests for data from the downstream services, as well as additional latency and/or overhead associated with processing of the requests by the downstream services.

Figure 2:
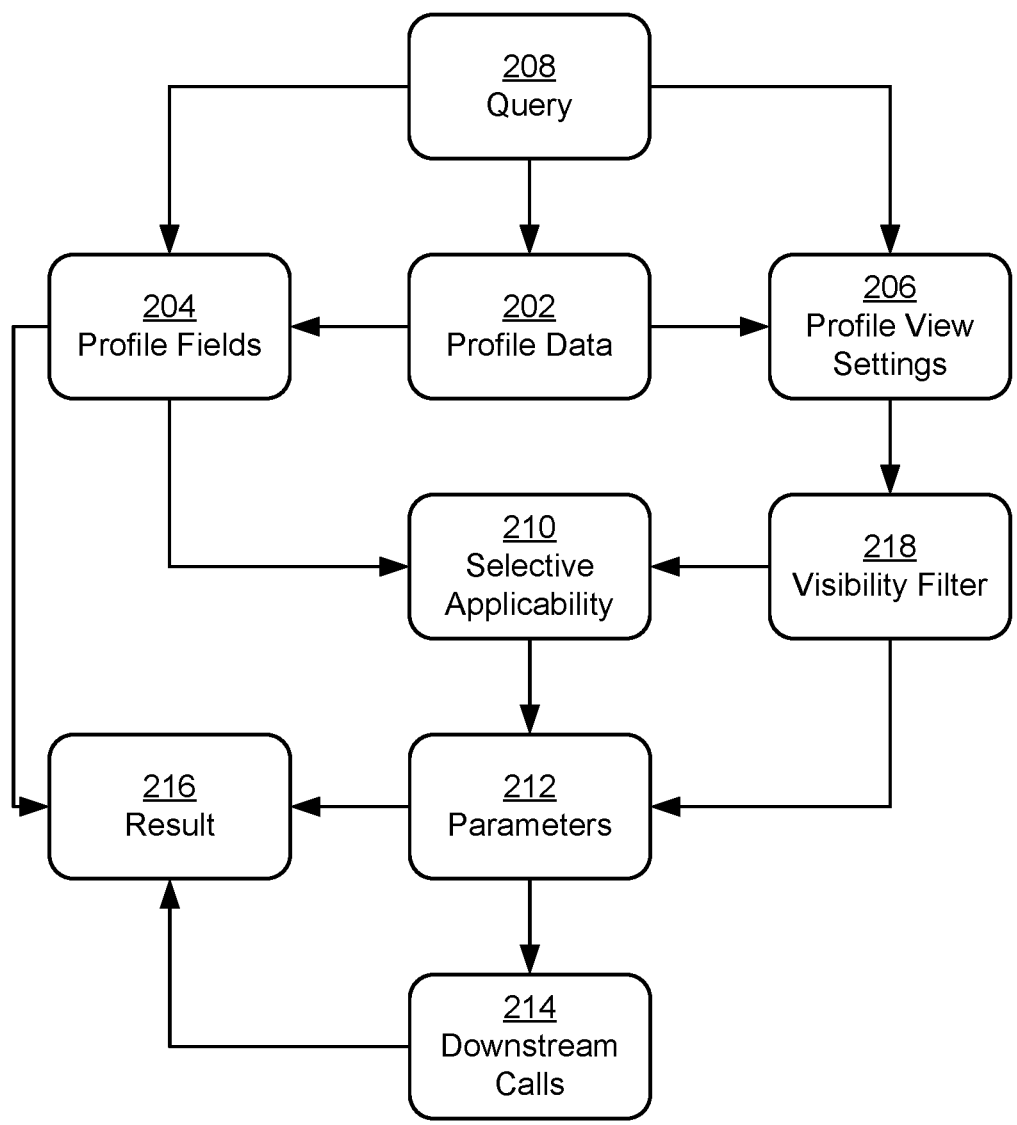
FIG. 2 shows the processing of a query of profile data in accordance with the disclosed embodiments.

In one or more embodiments, query-processing system 102 includes functionality to improve querying of profile data from profile repository 134 by reducing or eliminating unnecessary calls to downstream services by profile service 112. As shown in FIG. 2, a query 208 for profile data 202 may include a read request for one or more profile fields 204 from profile data 202. For example, query 208 may include a set of projection fields that identify one or more profile fields 204 to be retrieved from profile data 202. Conversely, query 208 may request all available profile fields 204 from profile data 202.

Query 208 and/or profile data 202 may also be used to obtain a set of profile view settings 206 for the viewer and/or viewee associated with query 208. As mentioned above, profile view settings 206 may include a privacy setting for the viewee and/or a viewer setting for the viewer.

Next, profile view settings 206 and/or profile fields 204 requested in query 208 may be used to determine a selective applicability 210 of one or more parameters 212 associated with profile view settings 206 to profile fields 204. More specifically, profile view settings 206 may be used to define a visibility filter 218 that restricts the visibility of one or more profile fields 204 for certain viewers and/or viewees. For example, profile view settings 206 may specify one or more profile fields 204 to be filtered from a result 216 of query 208, as well as one or more parameters 212 that determine if and how visibility filter 218 should be applied to the specified profile fields 204. Consequently, visibility filter 218 and/or parameters 212 may have selective applicability 210 when parameters 212 are used to selectively apply visibility filter 218 based on attributes associated with the viewer and/or viewee.

For example, a privacy setting in profile view settings 206 may specify that profile fields 204 for the last name, profile photo, and/or date of birth in a member's profile data 202 are visible only to other members who are directly connected to the member in a social network. As a result, visibility filter 218 may apply to the specified profile fields 204, and parameters 212 for applying visibility filter 218 may be set to first-degree connections of the member to whom profile data 202 belongs.

In another example, a social network member's viewer setting in profile view settings 206 may specify that all profile photos of other members in the social network are to be hidden from the member. Thus, visibility filter 218 may apply to the profile photo field in profile data 202 requested by the member, and parameters 212 for visibility filter 218 may be set to all other members of the social network. Consequently, parameters 212 may include, but are not limited to, a network distance between the entity to which profile data 202 belongs and the entity from which query 208 was received.

In one or more embodiments, profile view settings 206 and profile fields 204 requested by query 208 are used to identify instances in which a lack of selective applicability 210 of visibility filter 218 and/or the associated parameters 212 can be used to omit downstream calls 214 to services (e.g., downstream services of FIG. 1) that are used to resolve parameters 212 and generate result 216. For example, a profile service (e.g., profile service 112 of FIG. 1) and/or another component of a query-processing system (e.g., query-processing system 102 of FIG. 1) may assess selective applicability 210 of visibility filter 218 and/or parameters 212 for each query 208 of profile data 202 received by the query-processing system. If parameters 212 do not cause visibility filter 218 to be selectively applicable to profile fields 204 requested in query 208, the profile service may generate and return result 216 without making downstream calls 214.

First, visibility filter 218 and/or parameters 212 may lack selective applicability 210 when profile view settings 206 do not apply to any profile fields 204 requested in query 208. For example, query 208 may request profile fields 204 (e.g., first name, industry, etc.) that are viewable by all members of a social network and/or the public. Because the requested fields are all associated with unrestricted access, profile view settings 206 may lack selective applicability 210 to profile fields 204, and profile fields 204 may be included in result 216 without performing additional downstream calls 214 and/or filtering of profile fields 204.

Second, visibility filter 218 and/or parameters 212 may lack selective applicability 210 when profile data 202 lacks one or more profile fields 204 to which profile view settings 206 apply. For example, profile view settings 206 may prevent members who are not connected to a member in a social network from viewing the member's profile photo. If the member's profile data 202 lacks a profile photo, visibility filter 218 may be irrelevant to a request for the profile photo in query 208, and downstream calls 214 for determining if the viewer requesting the profile photo is connected to the member may be omitted.

Third, visibility filter 218 and/or parameters 212 may lack selective applicability 210 when parameters 212 do not require resolution using downstream calls 214. For example, a privacy setting for a profile photo may specify that the profile photo is visible to everyone. As a result, the profile photo may be included in result 216 without making downstream calls 214 to determine if and how visibility filter 218 should be applied to the profile photo. In another example, a viewer setting in a social network may require profile photos for all other members of the social network to be filtered from the requested profile fields 204. Because the filter is applied to all sets of profile fields 204 requested by the viewer, profile view settings 206 may lack selective applicability 210, and downstream calls 214 to retrieve parameters 212 for applying the filter may be omitted.

Conversely, visibility filter 218 and/or parameters 212 may have selective applicability 210 when a profile field is requested in query 208, exists in profile data 202, and is associated with one or more profile view settings 206 that restrict the visibility of the profile field based on network distance, entity or account types, and/or other parameters 212. The profile service may thus be required to make one or more downstream calls 214 to services for resolving parameters 212 before generating result 216.

To minimize latency and/or overload associated with downstream calls 214, the profile service may identify a subset of downstream calls 214 required to resolve parameters 212 and omit other downstream calls 214 that are not required to resolve parameters 212. For example, the profile service may obtain, from profile view settings 206, a privacy setting that specifies that the profile photo, last name, and/or date of birth in profile data 202 for a viewee is visible only to social network connections of the viewee. To determine if visibility filter 218 applies to requested profile fields 204 that include the profile photo, last name, and/or date of birth, the profile service may generate downstream calls 214 to one or more services that provide network distance and/or pending invitation information for the social network. If data returned by the services indicates that the viewer that generated query 208 is a first-degree connection of the viewee and/or has a pending invitation from the viewee, the profile service may include all requested profile fields 204 in result 216. If the returned data indicates that the viewer is not a first-degree connection of the viewee and does not a pending invitation from the viewee, the profile service may filter the profile photo, last name, and/or date of birth fields from result 216 before returning result 216 in a response to query 208.

In another example, the profile service may obtain, from profile view settings 206, a viewer setting that specifies that profile data 202 shown to the viewer should not include a profile photo when the viewee is outside an extended network of the viewer. To determine if visibility filter 218 applies to the profile photo of the viewee, the profile service may generate downstream calls 214 to one or more services that provide network distance, pending invitation, and/or group membership information for the social network. If data returned by the services indicates that, for example, the viewer and viewee have a network distance that's within 3 hops, the viewee has a pending invitation from the viewer, and/or the viewer and viewee are members of the same group, the profile service may include the profile photo in result 216 when the profile photo is requested by query 208. If the returned data indicates that the viewer and viewee are separated by a network distance of greater than 3 hops, the viewee does not have a pending invitation from the viewer, and the viewer and viewee do not have any common group memberships, the profile service may exclude the profile photo from result 216.

By minimizing downstream calls 214 during processing of query 208, the profile service and/or other components of the query-processing system may reduce latency and/or load associated with querying of profile data 202. Consequently, the disclosed embodiments may improve the performance of query-processing technologies and/or computer systems on which the query-processing technologies execute.

Figure 3:
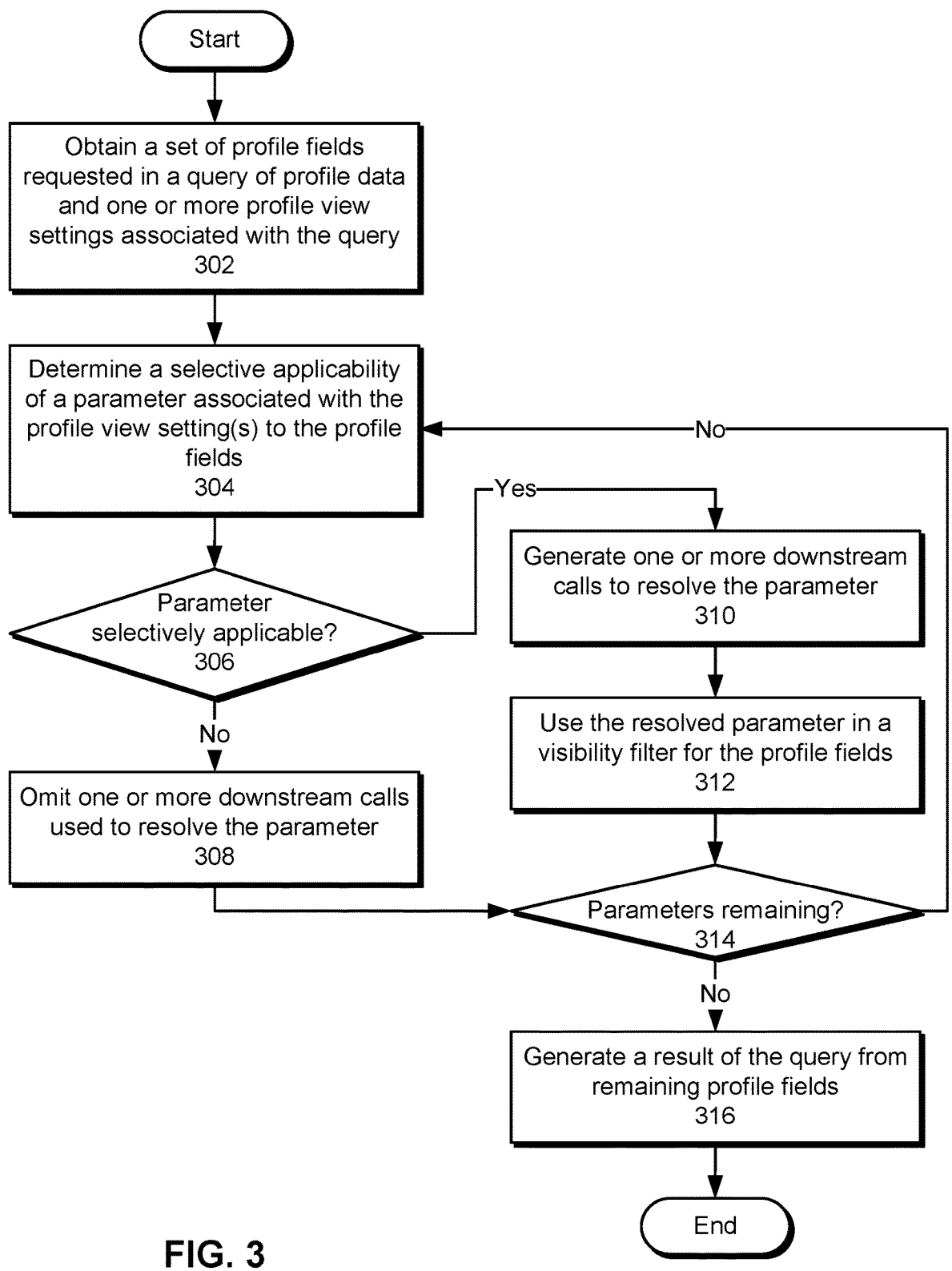
FIG. 3 shows a flowchart illustrating the processing of a query of profile data in accordance with the disclosed embodiments.

FIG. 3 shows a flowchart illustrating the processing of a query of profile data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a set of profile fields requested in a query of profile data and one or more profile view settings associated with the profile data are obtained (operation 302). The profile fields may include a first name, last name, maiden name, profile photo, professional or personal headline, date of birth, address, email address, phone number, industry, title, work experience, educational background, and/or other personal, professional, or demographic attributes of a member of a social network or other community of users. The profile view settings may include a configurable privacy setting for a viewee associated with the profile data and/or a configurable viewer setting for a viewer requesting the profile data.

Next, a selective applicability of a parameter associated with the profile view setting(s) to the profile fields is determined (operation 304). For example, the parameter may specify a network distance, account type, and/or other attribute that is used to selectively apply a visibility filter to the requested profile field. As a result, the parameter may lack selective applicability to the profile fields when the profile view settings do not apply to any of the requested profile fields, the profile data lacks profile fields to which the parameter applies, and/or the parameter does not require resolving by any downstream calls (e.g., when the parameter is broadly applied instead of selectively applied). On the other hand, the parameter may be selectively applicable to the profile fields when a given profile is requested, exists in the profile data, and is associated with a profile view setting that is applied based on network distance, account type, and/or other attributes.

Subsequent processing of the query may continue based on the selective applicability of the parameter (operation 306) to the requested profile fields. If the parameter is not selectively applicable to the requested profile fields, one or more downstream calls used to resolve the parameter are omitted (operation 308) during processing of the query. For example, a profile view setting that shows or hides a given profile field for all viewers may be used to omit downstream calls to services that resolve network distance, account types, and/or other parameters associated with selective showing or hiding of the profile field.

If the parameter is selectively applicable to the requested profile fields, one or more downstream calls to resolve the parameter are generated (operation 310), and the resolved parameter is used in the visibility filter (operation 312). For example, the parameter may represent a network distance (e.g., connections, extended network, etc.), commonality (e.g., common group membership, school, employer, connection, etc.), and/or account type (e.g., administrator, premium, paid, etc.) required to view one or more of the profile fields. In turn, downstream calls may be made to one or more services providing information related to network distances, groups, schools, employers, common connections, and/or account types to determine if the parameter is met by the viewer and/or viewee associated with the query. If the parameter is met, the visibility filter may be omitted from the corresponding profile field(s). If the parameter is not met, the visibility filter may be applied to the corresponding profile field(s) (e.g., by removing the corresponding profile field(s) from a result of the query).

Operations 304-312 may be repeated for remaining parameters (operation 314) in the profile view settings. For example, each parameter (e.g., network distance, commonality, account type, etc.) specified in the profile view settings may be analyzed for selective applicability (operations 304-306) to the requested profile fields, and downstream calls for resolving the parameter may be omitted or generated based on the selective applicability (operations 308-310). Any resolved parameters may then be used in visibility filters for the corresponding profile fields (operation 312). Once a given parameter is resolved for one profile view setting, the resolved parameter may be used with visibility filters for other profile view settings instead of repeating the same downstream calls to resolve the parameter during processing and/or filtering associated with the other profile view settings.

Finally, a result of the query is generated from remaining profile fields (operation 316) that have not been filtered in operations 308-312. For example, the result may include profile fields that comply with privacy settings, viewer settings, and/or other profile view settings associated with the query. The result may be included in a response to the query, and the response may be transmitted to the entity from which the query was received.

Figure 4:
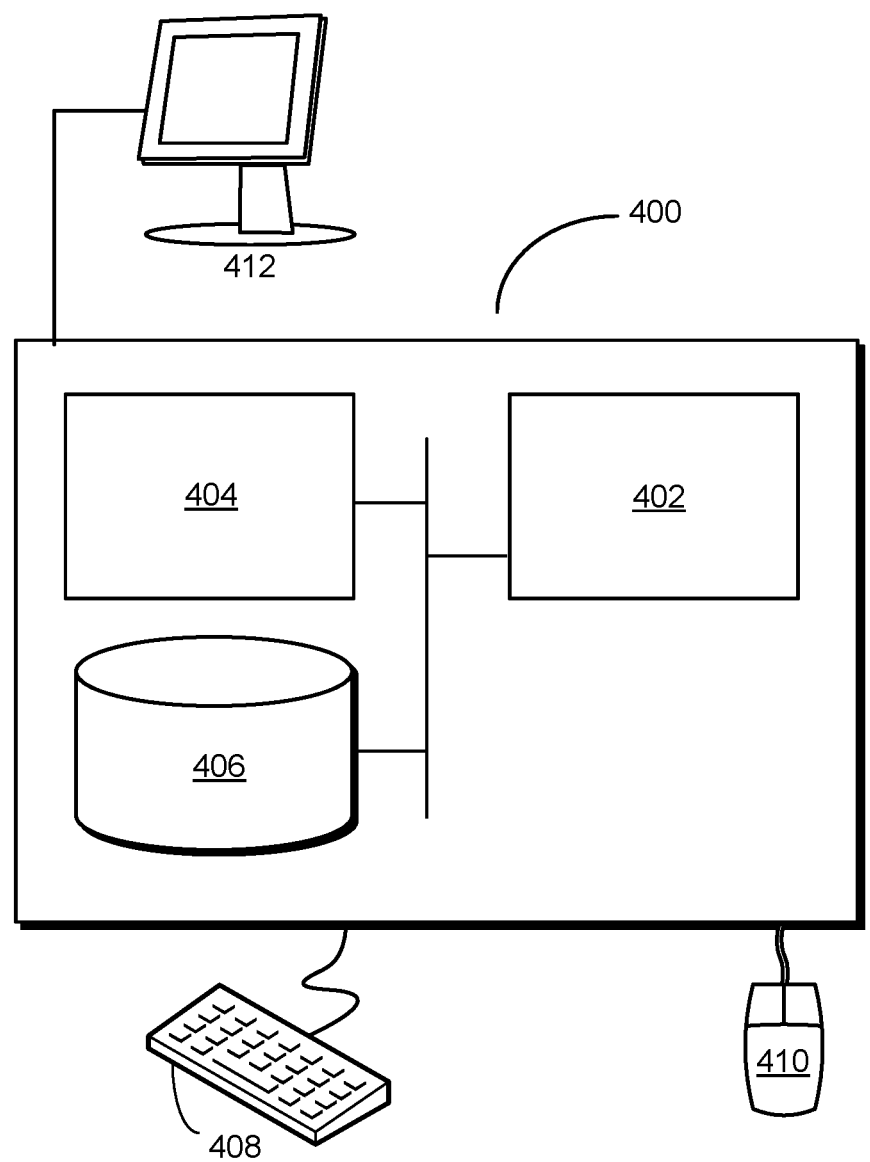
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for processing a query of profile data. The system may include a profile service and/or one or more downstream services. The profile service may obtain a set of profile fields requested in a query of profile data and one or more profile view settings associated with the profile data. Next, the profile service may determine, based on the set of profile fields and the profile view setting(s), one or more downstream calls to omit from a set of downstream calls used to generate a result of the query. The profile service may then generate the result of the query without making the downstream call(s).

In addition, one or more components of computer system 400 may be remotely located and connected to the other components over a network. Portions of the present embodiments (e.g., profile service, downstream services, query-processing system, profile repository, etc.) may also be located on different nodes of a distributed system that implements the embodiments. For example, the present embodiments may be implemented using a cloud computing system that processes queries of profile data for a set of remote members and/or entities.

By configuring privacy controls or settings as they desire, members of a social network, online professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for querying profile data within an online service, the method comprising:
   obtaining, by a query processing service, a set of profile fields associated with a profile of a member of the online service as requested in a query of profile data and one or more profile view settings associated with the profile of the member;
   determining, by a computer system, based on the set of profile fields and the one or more profile view settings, one or more downstream calls to omit from a set of downstream calls available to generate a result of the query, each downstream call in the set of downstream calls representing a call to a service on which the query processing service depends;
   generating one or more additional downstream calls in the set of downstream calls to resolve a parameter used to generate a result of the query; and
   using the parameter to generate the result of the query without making the one or more downstream calls.

2. The method of claim 1, wherein determining the one or more downstream calls to omit from the set of downstream calls comprises:
   determining a lack of selective applicability of a parameter associated with the one or more profile view settings to the set of profile fields;
   identifying, for omission from the set of downstream calls, the one or more downstream calls used to resolve the parameter; and,
   omitting the identified one or more downstream calls used to resolve the parameter.

3. The method of claim 2, wherein determining the lack of selective applicability of the parameter to the set of profile fields comprises:
   determining that the one or more profile view settings do not apply to the set of profile fields requested in the query.

4. The method of claim 2, wherein determining the lack of selective applicability of the parameter to the set of profile fields comprises:
   determining that the profile data lacks a profile field to which the parameter applies.

5. The method of claim 2, wherein determining the lack of selective applicability of the parameter to the set of profile fields comprises:
   determining that the parameter does not require resolving by the one or more downstream calls.

6. The method of claim 1, wherein generating the one or more additional downstream calls in the set of downstream calls to resolve the parameter used to generate a result of the query comprises:
   using the one or more additional downstream calls to resolve the parameter of a visibility filter for the set of profile fields; and
   using the resolved parameter in the visibility filter.

7. The method of claim 6, wherein the parameter comprises a network distance in a social network.

8. The method of claim 7, where the network distance comprises at least one of:
   a distance of 1 represented by a connection or a pending invitation; and
   an extended distance represented by a third-degree connection or a common group membership.

9. The method of claim 1, wherein the one or more profile view settings comprise a viewer setting for a viewer of the profile data.

10. The method of claim 1, wherein the one or more profile view settings comprise a privacy setting for the profile data.

11. The method of claim 1, wherein the set of profile fields comprises at least one of:
    a last name;
    a maiden name;
    a profile photo;
    a headline;
    a date of birth;
    an address; and
    a phone number.

12. A system for querying profile data within an online service, the system comprising:
    one or more processors; and
    memory storing instructions that, when executed by the one or more processors, cause the apparatus to:
    obtain, by a query processing service, a set of profile fields associated with a profile of a member of the online service as requested in a query of profile data and one of more profile view settings associated with the profile of the member;
    determine, based on the set of profile fields and the one or more profile view settings, one or more downstream calls to omit from a set of downstream calls available to generate a result of the query, each downstream call in the set of downstream calls representing a call to a service on which the query processing service depends;
    generate one or more additional downstream calls in the set of downstream calls to resolve a parameter used to generate a result of the query, and
    use the parameter to generate the result of the query without making the one or more downstream calls.

13. The system of claim 12, wherein determining the one or more downstream calls to omit from the set of downstream calls comprises:
    determining a lack of selective applicability of a parameter associated with the one or more profile view settings to the set of profile fields;
    identifying, for omission from the set of downstream calls, the one or more downstream calls used to resolve the parameter; and
    omitting the identified one or more downstream calls used to resolve the parameter.

14. The system of claim 13, wherein determining the lack of selective applicability of the parameter to the set of profile fields comprises:
    determining that the one or more profile view settings do not apply to the set of profile fields requested in the query.

15. The system of claim 13, wherein determining the lack of selective applicability of the parameter to the set of profile fields comprises:
    determining that the profile data lacks a profile field to which the parameter applies.

16. The system of claim 13, wherein determining the lack of selective applicability of the parameter to the set of profile fields comprises:
  determining that the parameter does not require resolving by the one or more downstream calls.

17. The system of claim 13, wherein generating the one or more additional downstream calls in the set of downstream calls to resolve the parameter used to generate a result of the query comprises:
  using the one or more additional downstream calls to resolve the parameter of a visibility filter for the set of profile fields; and
  using the resolved parameter in the visibility filter.

18. The system of claim 13, wherein the one or more profile view settings comprise at least one of:
  a viewer setting for a viewer of the profile data; and
  a privacy setting for the profile data.

19. A non-transitory computer-readable storage medium storing instructions that when executed by a computer cause the computer to perform a method, the method comprising:
  obtaining, by a query processing service, a set of profile fields associated with a profile of a member of an online service as requested in a query of profile data and one of more profile view settings associated with the profile of the member;
  determining, based on the set of profile fields and the one or more profile view settings, one or more downstream calls to omit from a set of downstream calls available to generate a result of the query, each downstream call in the set of downstream calls representing a call to a service on which the query processing service depends;
  generating one or more additional downstream calls in the set of downstream calls to resolve a parameter used to generate a result of the query, and
  using the parameter to generate the result of the query without making the one or more downstream calls.

20. The non-transitory computer-readable storage medium of claim 19, wherein determining the one or more downstream calls to omit from the set of downstream calls comprises:
  determining a lack of selective applicability of a parameter associated with the one or more profile view settings; and
  identifying, for omission from the set of downstream calls, the one or more downstream calls used to resolve the parameter; and
  omitting the identified one or more downstream calls used to resolve the parameter.

* * * * *